March 29, 1966     J. V. HUGHES     3,242,795

STAR ANGLE SENSOR

Filed Aug. 31, 1961     6 Sheets-Sheet 1

INVENTOR
JOHN V. HUGHES
BY Donald J. Bradley
AGENT

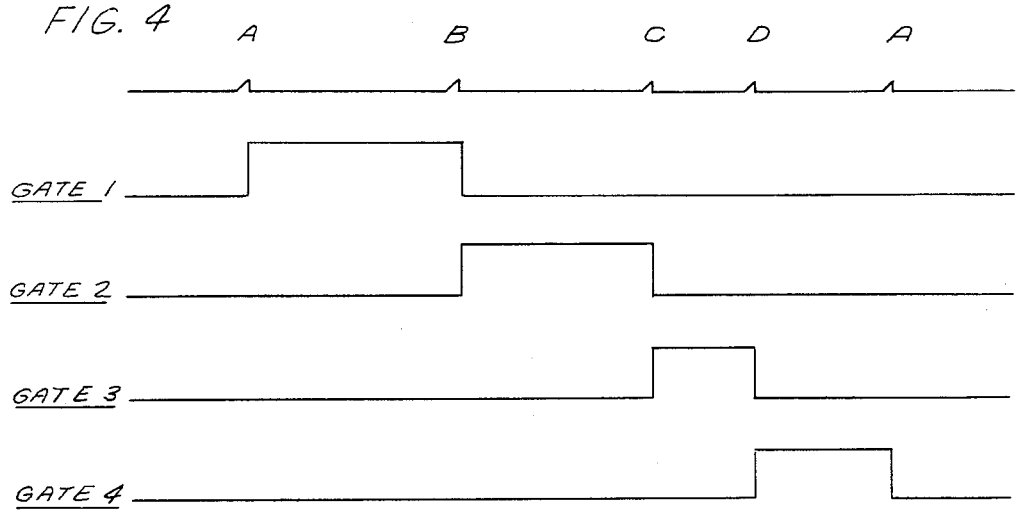
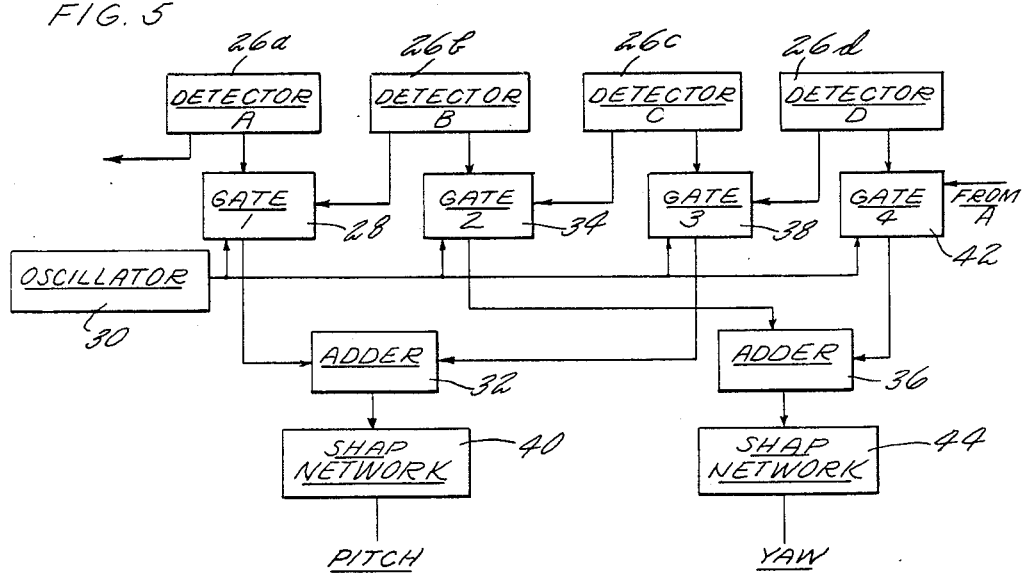

March 29, 1966  J. V. HUGHES  3,242,795
STAR ANGLE SENSOR
Filed Aug. 31, 1961  6 Sheets-Sheet 3

INVENTOR
JOHN V. HUGHES
BY Donald J. Bradley
AGENT

March 29, 1966  J. V. HUGHES  3,242,795
STAR ANGLE SENSOR
Filed Aug. 31, 1961  6 Sheets-Sheet 4

INVENTOR
JOHN V. HUGHES
BY Donald J. Bradley
AGENT

INVENTOR
JOHN V. HUGHES
BY Donald J. Bradley
AGENT

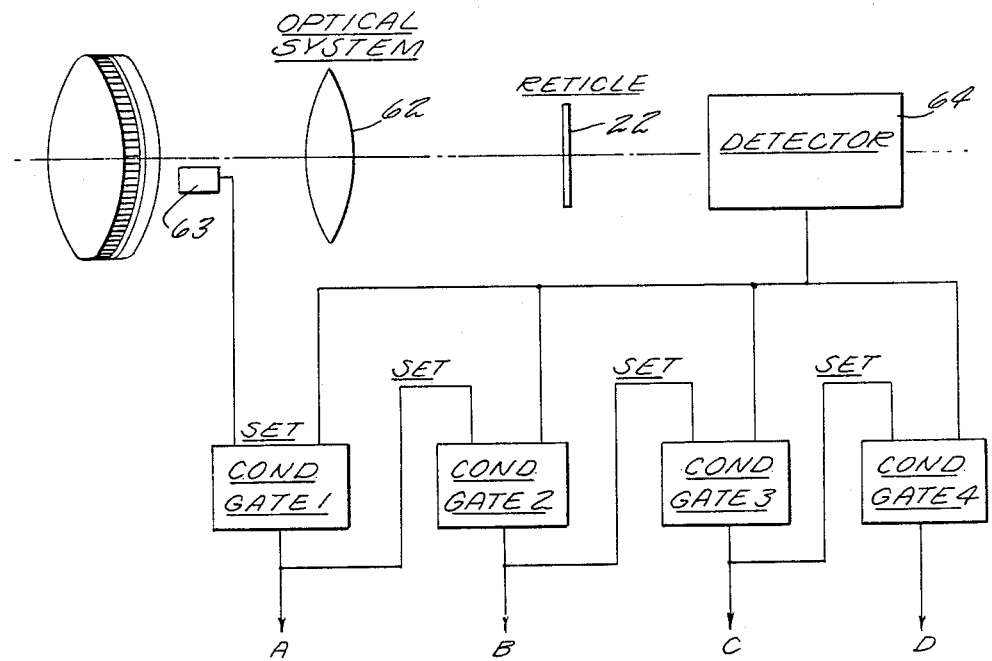

United States Patent Office 3,242,795
Patented Mar. 29, 1966

3,242,795
STAR ANGLE SENSOR
John Victor Hughes, West Hartford, Conn., assignor to United Aircraft Corporation, East Hartford, Conn., a corporation of Delaware
Filed Aug. 31, 1961, Ser. No. 135,339
6 Claims. (Cl. 88—14)

This invention relates to an electro-optical apparatus and in particular to a star angle sensor for determining the magnitude and orientation of a star angle.

Many guidance and control systems for aircraft and missile applications utilize star position information for purposes of accurate navigation. This invention may be used in conjunction with such navigational systems and will provide extremely accurate position information.

It is, therefore, an object of this invention to provide a novel electro-optical apparatus which will accurately determine the deviation of the line of sight to a stellar body from the optic axis of the apparatus.

Another object of this invention is to provide a novel star angle sensor in which the star image is rotated about a reticle having four quadrants.

A further object of this invention is to provide new and improved radiant energy responsive apparatus.

Another object of this invention is to provide a simplified and accurate electronic system for producing accurate position information from a star sight.

These and other objects and a fuller understanding of this invention may be had by referring to the following specification and claims, read in conjunction with the drawings, in which:

FIG. 1 is a schematic representation of the optical and detection system of the star angle sensor; and FIG. 2 shows a simple telescopic system; and FIG. 3 shows the geometry of the reticle of FIG. 1; and FIG. 4 is a diagram showing the waveforms of the detector outputs; and FIG. 5 is a schematic diagram of the detector electronic system; and FIG. 6 shows the geometry of another reticle which may be used with FIG. 1; and FIG. 7 is a diagram showing the waveforms of the detector outputs; and FIG. 8 is a schematic diagram of the detector electronic system utilizing the reticle of FIG. 6; and FIG. 9 is a functional block diagram showing the operation of another detector system.

FIG. 11 is a functional block diagram of a modification of the detector system of FIG. 9.

The purpose of the star angle sensor is to provide a means for determining the star angle associated with a star sight and for transmitting this information in a useful form to a computer or other apparatus for utilizing the star angle information. The star angle is the angle that the actual direction of a star selected for a star sight makes with respect to the direction in which optic axis of the star angle sensor is directed. To more precisely define the star angle, the telescope used to view the star may be imagined as pivoted about two axes, perpendicular to one another and to the optic axis of the telescope. One of these axes will be called the pitch axis, the other the yaw axis. If the telescope were mounted to look along the longitudinal axis of a conventional aircraft or missile, these two axes would coincide with the conventional pitch and yaw axes of the aircraft or missile. If now the telescope is rotated about these axes to bring the optic axis into coincidence with the line of sight of the star, the rotations about the pitch axis and about the yaw axis would be called the "star angle in pitch" and the "star angle in yaw" respectively. These two components completely define the deviation of the line of sight of the star from the optic axis of the telescope, both in magnitude and direction.

Figure 1:
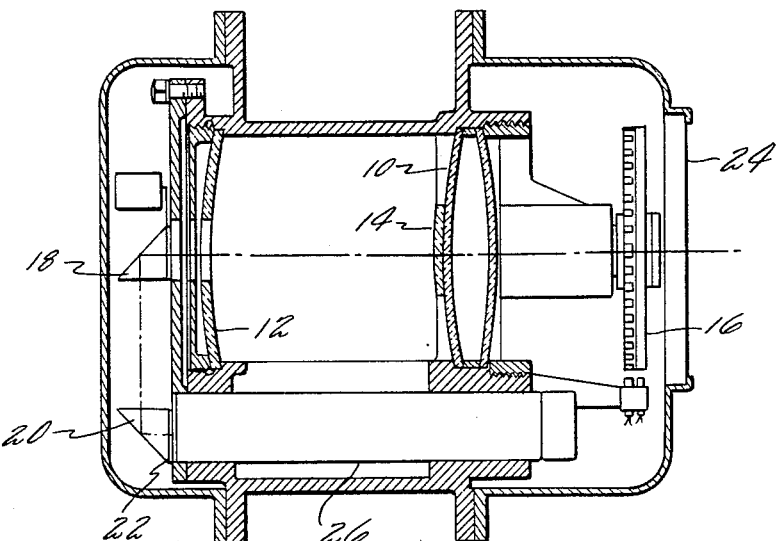
Figure 2:
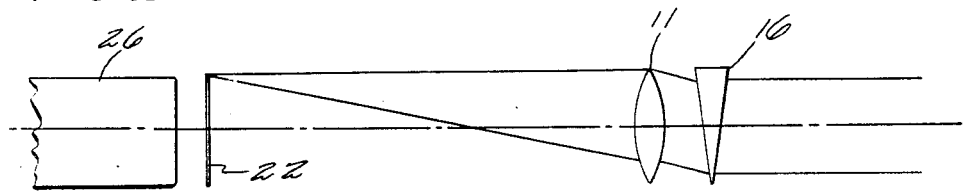

A basic component of the star angle sensor is a telescope to view the star. Any design of telescope will suffice, and in FIGURE 2 a simplified design using a simple refracting telescope is shown. In an instrument in which space is at a premium, a folded catadioptric system having all spherical surfaces, of the Maksutov-Cassegrain type, as shown in FIGURE 1, is used. Referring to FIGURE 1, a concave mirror 12 acts as primary focussing system, while a secondary mirror 14 modifies the focussing and assists in shortening the system. Two meniscus lenses 10 introduce optical correction, and mirror 14 is attached to one face of one of these lenses. A pair of right angled prisms 18 and 20 totally reflect the light, further assisting in space saving. Parallel light incident from the right of FIGURE 1 would be brought to a focus as a point on the reticle 22 close behind prism 20. In FIGURE 2, a lens 11 forms the primary focussing system, and parallel light (such as light from a star) incident from the right of FIGURE 2 would be brought to a focus as a point on the reticle 22.

A means for causing the focussed spot to move in a circular path is required for the star angle sensor. In FIGURES 1 and 2, a wedge 16 causes a slight deviation of the incident light, and rotation of this wedge round the optic axis of the telescope will cause the image (the focussed spot) to move in a circle on reticle 22. An alternative means of accomplishing this end would be to reflect the light, at any point before it reached the image, from a plane mirror at an angle to the beam, and to rotate this mirror about an axis making a small angle with the normal to the mirror.

Figure 3:
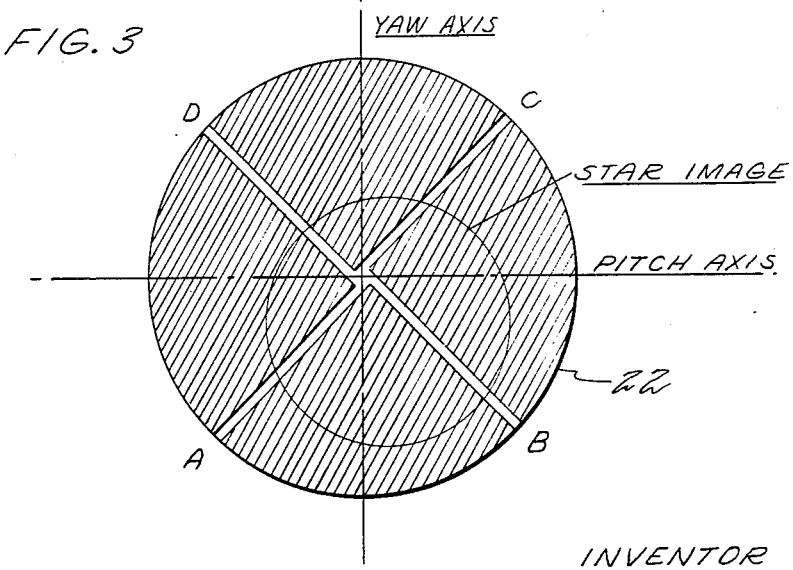

Reticle 22 contains four dark quadrants separated by clear slits, as shown in FIGURE 3. When the focussed image falls on one of the clear slits, the light passes through the reticle and impinges on some detector (26 in FIGURES 1 and 2) which produces an electrical signal when illuminated by light, such as a photomultiplier detector.

Without the presence of the rotating wedge 16 at the front of the optical system, the star image focused on reticle 22 would be fixed in position. The purpose of the rotating wedge 16 is to deviate the star image radially with respect to the optic axis of the sensor. The resulting interaction between the rotating, radially displaced star image, and the fixed reticle pattern causes the detector to produce a series of pulses which contain the necessary information on the star angle magnitude and direction.

FIG. 3 shows the geometry associated with the reticle 22. The reticle has four dark quadrants, separated by relatively narrow slits through which light can be transmitted. The reticle, which is mounted in the focal plane of the optical system, is oriented so that the center line of one dark portion of the reticle is parallel to the yaw axis, while the center line of the other dark portion is parallel to the pitch axis. This construction may be modified, as will subsequently be described.

The operation of the system can be described as follows. The rotation of the optical wedge 16 causes the star image to rotate in a circular path on the reticle 22. If the line of sight of the star angle sensor is coincident with the optical axis of the sensor, then the center of the image circle lies at the center of the reticle. If the line of sight to the star is not coincident, however, then the center of the image circle will be displaced with respect to the yaw and pitch axes in the same way that the star angle is oriented with respect to the axes.

For the following description it will be assumed that a photomultiplier or other starlight detector is positioned immediately behind each light transmitting slit of reticle 22. Thus, there will be four detectors, each generating an output in the form of a pulse when the star image passes the associated slit and actuates the detector.

FIGURES 4 and 5 show the output signals and electronic circuitry which will convert the star image pulses into position information. The action of the rotating wedge 16 will cause the star image to traverse a circular path over the reticle, successively illuminating each slit, as shown by FIG. 3.

FIG. 5 illustrates in block diagram form the electronic circuitry which produces the waveforms of FIG. 4. Detectors 26a, 26b, 26c, and 26d are positioned immediately behind slits A, B, C, and D of FIG. 3, respectively. As the star image passes slit A, a pulse is generated in detector A and fed to a gating circuit 28. When the star image passes through the dark quadrants of reticle 22, no output signals are generated by the detectors. Gate 28 may be a trigger type of circuit which has two states of operation. When gate 28 is "on," an alternating output from oscillator 30 is passed through gate 28 to adder 32 where the number of cycles will be counted. When gate 28 is "off," the alternating signals from oscillator 30 will be blocked.

One important advantage of the present detector can be seen from the above description. The gate 28 is opened when A first observes the light from the star, and the gate is closed when detector B first observes the light from the star. In other words, opening and closing of gate 28 is operated by almost identical events on two different detectors. By this means any accidental variations of light intensity, or fluctuations of signal due to electrical noise, tend to be self-compensating, and the length of time that the gate is open is almost independent of such accidental variations. This same principle of insuring that timing is started and stopped by almost identical events is maintained in all variatons of the system which will be described subsequently.

It will be assumed that the pulse from detector A triggers gate 28 into the on condition and that adder 32 will count the number of oscillations until gate 28 is turned off by a pulse from detector B. Thus, adder 32 will now contain a number equivalent to the time interval between and necessary for the star image to pass from slit A to slit B.

As the star image passes slit B, detector B will generate a pulse which turns off gate 28. At the same time, the pulse from detector B will turn on gate 34, and the output from oscillator 30 will pass through gate 34 and be counted by adder 36 which is similar to adder 32.

As the star image passes slit C, the pulse from detector C will turn off gate 34 and turn on gate 38. The oscillator signals passed by gate 38 will be transmitted to adder 32 and subtracted from the number already stored in adder 32. When gate 38 is turned off by a pulse from detector D, adder 32 will contain a number indicative of the magnitude of the deviation of the star image from the pitch axis. The sign of the number in the adder 32 will indicate the directon of deviation. It will be assumed that any deviation above the pitch axis will be positive, while deviations below it will be negative.

The resultant number contained in adder 32, which may be a digital representation, will not be directly proportional to the error, but may be converted to the true error by means of a shaping network 40.

As the star image passes slit D, the pulse from detector D will turn gate 38 off and turn gate 42 on. Gate 42 is connected with adder 36, which will subtract the number of cycles similar to the operation of adder 32. The shaping network 44 connected to adder 36 will translate the resulting number of cycles into deviation from the yaw axis. Deviations to the left of the yaw axis will be considered positive, to the right of the yaw axis negative.

FIG. 4 shows the envelope of the alternating signals passed by the gates 28, 34, 38, and 42 relative to the detector outputs. As can be seen from the figure, the timing between the pulses A, B, C, and D determines the width of the envelope and ultimately the count in adders 32 and 36. Each portion of the pulse pattern of FIG. 4 can be identified with a particular sector of the associated reticle pattern shown in FIG. 3. The width of that portion of the pulse pattern identified with the sector in which the star image circle is centered increases and decreases, respectively, as the magnitude of the star angle increases and decreases. The width of that portion of the pattern identified with the opposite sector will, on the other hand, decrease and increase as the magnitude of the star angle increases or decreases. The portions of the pulse pattern having the long pulse durations will identify the directions of the displacement components of the star image circle along the yaw and pitch axes. The pulse durations establish the magnitude of the two displacement components. Since the location of the star image circle on the reticle pattern defines the star angle it is obvious that the pulse pattern uniquely defines the star angle.

Figure 6:
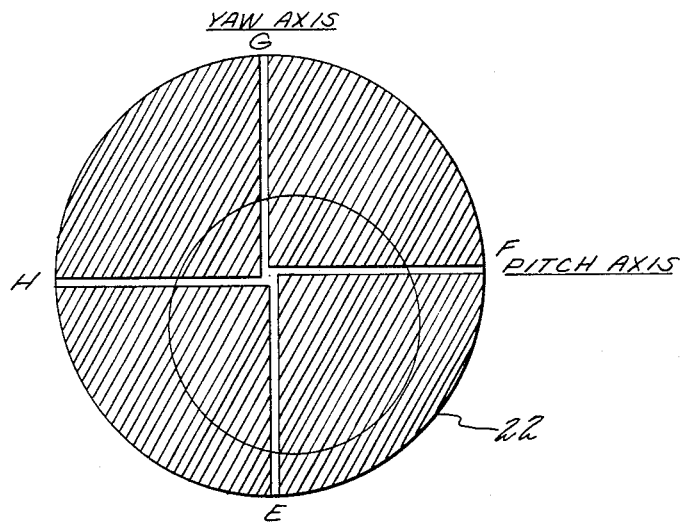

FIG. 6 shows a modification of the reticle pattern which will result in a simplification of the circuitry involved. The slits in reticle 22 are now oriented along the yaw and pitch axes rather than at 45° to the axes as in FIG. 3.

Figure 7:
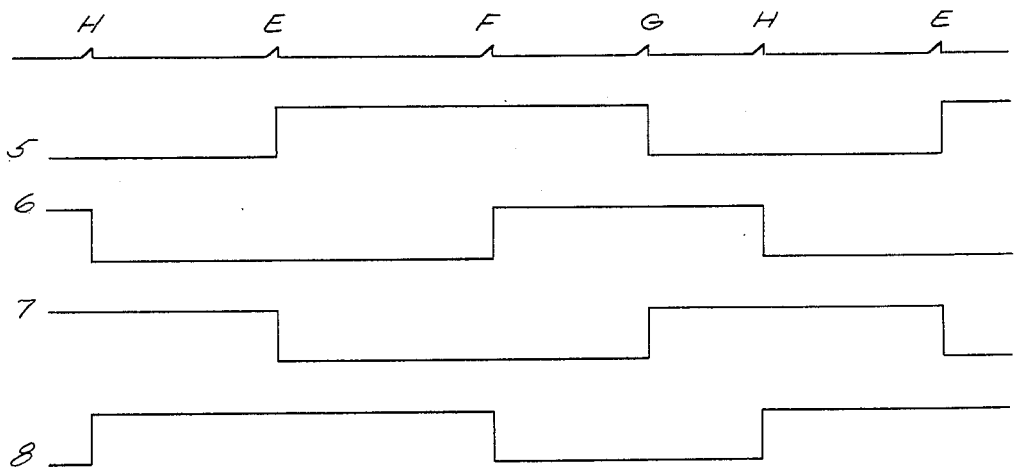
Figure 8:
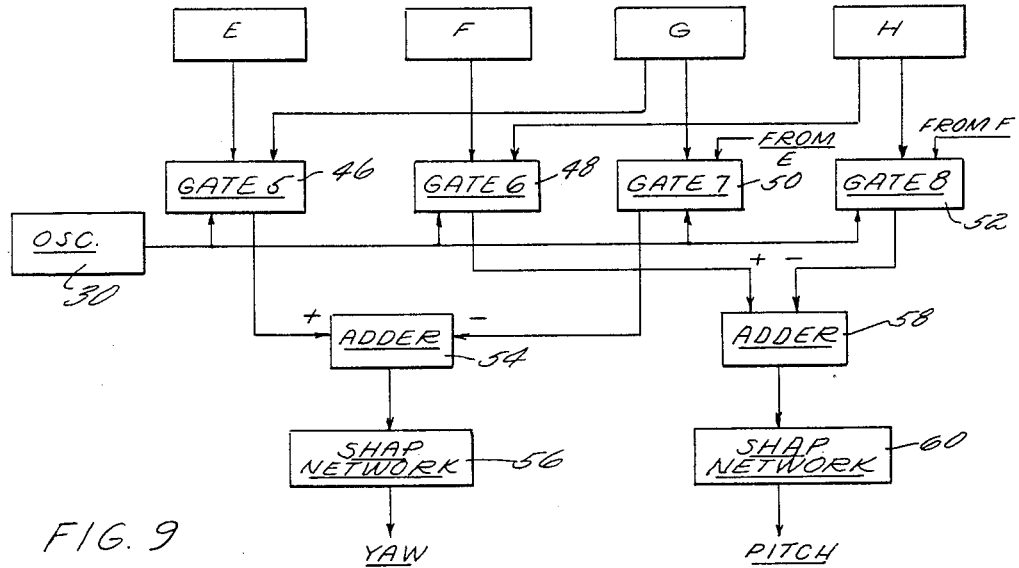

Reference to FIGS. 7 and 8, which are similar to FIGS. 4 and 5, shows that the gates, numbered 46, 48, 50 and 52, will now pass the oscillator output signals for approximately 180° of the star image circle. Gate 46, for example, will be turned on by a pulse from detector E and turned off by a pulse from detector G. The signals passed through gate 46 will be added and that passed through gate 50 will be subtracted in adder 54, and the resulting count will be passed through shaping network 56 to produce a yaw error signal. It can be shown that the positioning of the reticle slits coincident with the axes will result in a count in the adders which is a much more linear function of the true error than the use of the reticle of FIG. 3.

Similarly, the counts instituted by pulses from slits F and H are combined in adder 58 and modified by shaping network 60 to produce a pitch error output. FIGURE 7 shows waveforms from the signals passed by the gates.

Figure 9:
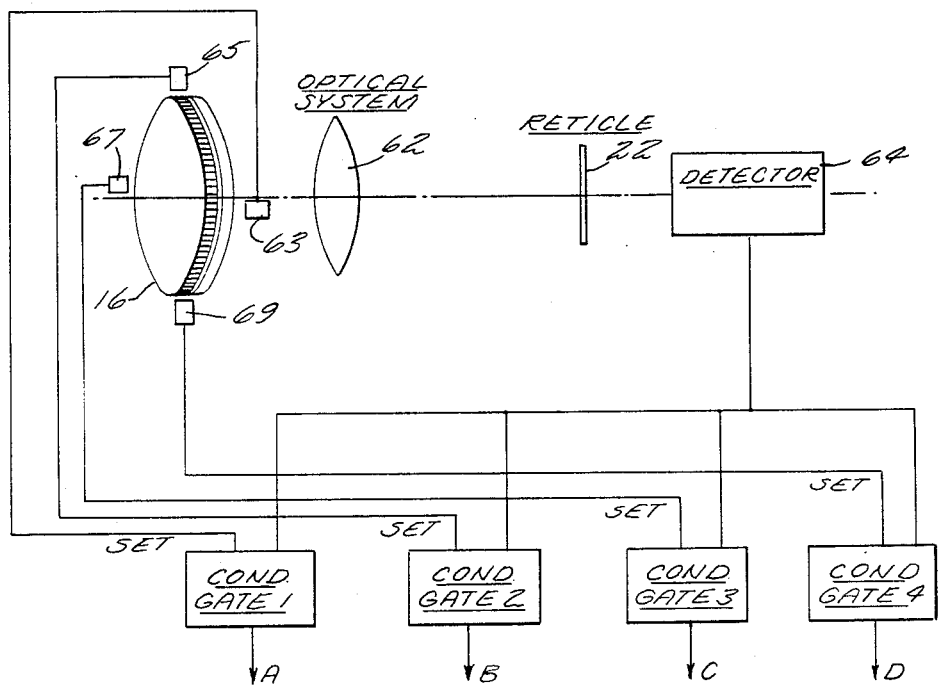

The foregoing systems have been described in terms of four separate light responsive detectors for each reticle, one detector being associated with each slit. A further simplification in the circuitry involved may be produced by utilizing only one detector positioned behind the reticle and responsive to light received from all slits. FIG. 9 schematically illustrates the operation of the system when one detector is used. The star image is passed by optical wedge 16 as before and the image is then passed through the optical system illustrated at 62 and through the reticle 22 to a detector 64. Detector 64 will thus generate an output pulse whenever the light passes through any of the reticle slits onto the detector face. The reticle 22 used in this case will be the same as in FIGURE 3. The output from detector 64 will thus be a series of timed pulses, the time between the pulses being a function of the star image position.

Some means is necessary of distinguishing which pulses correspond to which slits. One such means is shown in FIGURE 9, where use is made of "synch sensors" 63, 65, 67, 69, which detect the position of the rotating wedge. As example, these synch sensors could be pick-up coils mounted on the fixed frame close to the periphery of the wedge, and a small piece of iron would be mounted on the wedge at its thickest point. Then as the wedge rotated, each pick-up coil in turn would produce a pulse as the small piece of iron passed it. If two synch sensors are mounted at opposite ends of the pitch axis, and two at opposite ends of the yaw axis, then different synch signals are obtained for each quadrant. These are shown plotted against time in FIGURE 10.

These synch signals could be used to sort the signals from the detector in a variety of ways. One way, shown in FIGURE 9, uses four "conditional gate" electronic units. Normally such a gate is "closed," and will not pass a pulse coming from the detector. When a pulse is received on a "set" wire, the gate fed by the set wire is opened. The next pulse received from the detector is passed to the output, and this operation causes the gate to close, refusing any further detector pulses until another "set" pulse is received.

Imagine the thick end of the wedge just approaching the positive end of the pitch axis, which means that the star image will be in sector DA of the reticle. Then as rotation continues, the iron marker on the wedge will pass pick-up coil 63, and a "set" pulse will go to conditional gate 1. As rotation continues, the star image will cross slit A on the reticle, and a detector pulse will be generated. This will be rejected by all gates but conditional gate 1, which passes to the ouput marked A in FIGURE 9. At the same time, conditional gate 1 will be closed to further pulses. Further rotation of the wedge will operate synch sensor 65, which will open conditional gate 2, and further rotation will then bring the star image to slit B on the reticle, causing the detector to generate a pulse which will be passed by conditional gate 2 (thereby closing the gate), giving a pluse on output B of FIGURE 9. In a similar manner, synch sensor 67 will in turn open conditional gate C to pass the detector pulse generated by the star image crossing slit C; and so on. It will be seen that outputs A, B, C, D, of FIGURE 9 carry pulses corresponding to their respective slits, and these pulses can then be manipulated to determine the star angles in precisely the same way as the pulses for the individual detectors behind slits A, B, C, D were handled in FIGURE 5.

Figure 10:
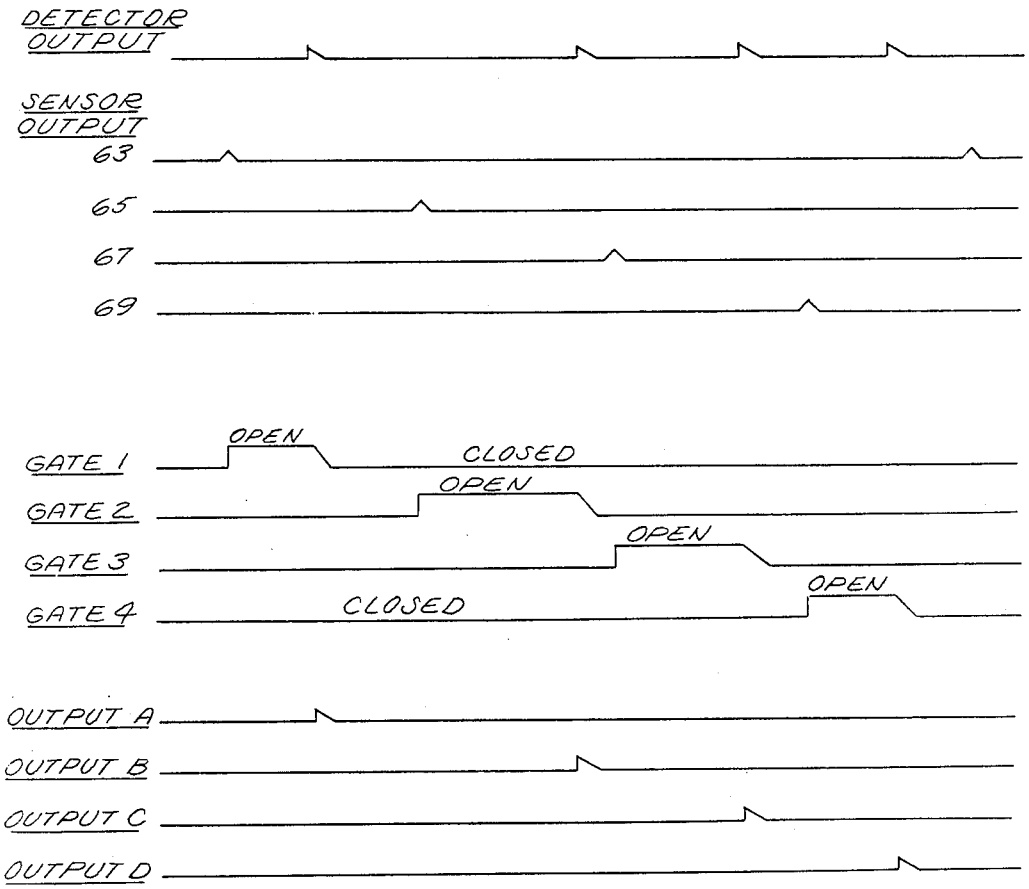
FIG. 10 shows the waveforms associated with FIG. 9.

In FIGURE 10 schematic waveforms corresponding to the above sequence of events are shown. An alternative using only one synch sensor, located on the positive pitch axis, is shown in FIGURE 11. This synch sensor opens conditional gate 1, which subsequently passes, and is closed by, the detector pulse from slit A. This in turn opens conditional gate 2, and so on, so that each slit effectively opens the next gate for the pulse from the next slit, until the detector pulse from slit D passes conditional gate 4, which it closes. All gates are now closed until the synch sensor re-opens the system.

Although the invention has been described with a certain degree of particularity, it is to be understood that the present disclosure has been made only by way of example and that numerous changes in the details of construction and the combination and arrangement of parts may be resorted to without departing from the spirit and scope of the invention as hereinafter claimed.

I claim:

1. Apparatus for determining the position of a radiant body comprising:
    means for viewing said body and focusing an image of said body upon a reticle,
    said reticle containing four equally spaced narrow apertures transparent to said image extending from a common center point and dividing said reticle into quadrants,
    means for causing said image to traverse each of said apertures consecutively,
    means responsive to the traversing of each aperture by said image for producing a pulse,
    four gating circuits connected to receive said pulses in consecutive order, each of said gating circuits being associated with a respective one of said apertures,
    the pulse produced by the traversal of each of said apertures being transmited to its respective gating circuit for energizing said respective gating circuit and also being transmitted to the gating circuit energized by the immediately preceding pulse for deenergizing said preceding gating circuit,
    means producing an alternating reference voltage,
    and a pair of adding circuits connected to receive said alternating reference voltage,
    alternate gating circuits passing said reference voltage to one of said adding circuits when said gating circuits are energized.

2. Apparatus as in claim 1 in which said means responsive to the traversing of each aperture by said image for producing a pulse comprises four image detectors, one detector being positioned adjacent each said aperture.

3. Apparatus for determining the position of a radiant body comprising:
    means for viewing said body and focusing an image of said body upon a reticle,
    said reticle containing four equally spaced narrow apertures transparent to said image extending from a common center point and dividing said reticle into quadrants,
    means for causing said image to transverse each of said apertures consecutively,
    means responsive to the traversing of each aperture by said image for producing a pulse,
    four gating circuits connected to receive said pulses in consecutive order, each of said gating circuits being associated with a respective one of said apertures,
    the pulse produced by the traversal of each of said apertures being transmitted to its respective gating circuit for energizing said respective gating circuit and also being transmitted to the gating circuit energized by the second preceding pulse for deenergizing said second preceding gating circuit,
    means producing an alternating reference voltage,
    and a pair of adding circuits connected to receive said alternating reference voltage,
    alternate gating circuits passing said reference voltage to one of said adding circuits when said gating circuits are energized.

4. Apparatus for determining the position of a radiant body comprising:
    means for viewing said body and focusing an image of said body upon a reticle, said reticle containing four equally spaced narrow apertures transparent to said image extending from a common point and dividing said reticle into quadrants,
    a rotating wedge for causing said image to traverse each of said apertures consecutively,
    four sensors positioned adjacent said wedge and responsive to the rotation of said wedge, each said sensor producing a reference signal indicative of the rotational position of said wedge,
    means responsive to the traversing of said apertures by said image for producing a series of pulses,
    four conditional gating circuits,
    means applying said series of pulses to each of said conditional gating circuits,
    means applying one of said reference signals to each of said conditional gating circuits,
    each of said conditional gating circuits being energized by its respective reference signal whereby only the first succeeding pulse applied thereto will be passed by each said conditional gating circuit,
    and means responsive to the time intervals between successive pulses passed by said conditional gating circuits for producing an output.

5. Apparatus for determining the position of a radiant body comprising:

means for viewing said body and focusing an image of said body upon a reticle, said reticle containing four equally spaced narrow apertures transparent to said image extending from a common point and dividing said reticle into quadrants, a rotating wedge for causing said image to traverse each of said apertures consecutively, at least one sensor responsive to the rotation of said wedge for producing reference signals indicative of the rotational position of said wedge, means responsive to the traversing of said apertures by said image for producing a series of pulses, four conditional gating circuits, means applying said series of pulses to each of said conditional gating circuits, means applying said reference signals to at least one of said conditional gating circuits for selectively energizing each of said conditional gating circuits whereby each said conditional gating circuit passes only the first succeeding pulse applied thereto, and means responsive to the time intervals between successive pulses passed by said conditional gating circuits for producing an output.

6. Apparatus as in claim 5 in which said four conditional gating circuits comprise:

a first conditional gating circuit energized by said reference signals for passing a first pulse corresponding to the traversal by said amge of one of said apertures, a second conditional gating circuit energized by said first pulse for passing a second pulse corresponding to the traversal by said image of a second of said apertures, a third conditional gating circuit energized by said second pulse for passing a third pulse corresponding to the traversal by said image of a third of said apertures, and a fourth conditional gating circuit energized by said third pulse for passing a fourth pulse corresponding to the traversal by said image of the fourth of said apertures.

References Cited by the Examiner

UNITED STATES PATENTS

| 2,946,893 | 7/1960 | Baum | 88—1 |
| 2,981,843 | 4/1961 | Hansen | 88—1 |
| 2,997,588 | 8/1961 | Wilcox | 88—1 |
| 2,999,939 | 9/1961 | Bible et al. | 88—1 |

JEWELL H. PEDERSEN, *Primary Examiner.*

FREDERICK M. STRADER, *Examiner.*

R. L. WIBERT, W. L. SIKES, *Assistant Examiners.*